Patented Oct. 3, 1944

2,359,282

UNITED STATES PATENT OFFICE 2,359,282

WATER-SOLUBLE COMPOUNDS HAVING VITAMIN K ACTIVITY

Bernard R. Baker, Nanuet, N. Y., assignor to Lederle Laboratories, Inc., New York, N. Y., a corporation of Delaware No Drawing. Application June 25, 1942, Serial No. 448,493

5 Claims. (Cl. 260—457)

This invention relates to water-soluble derivatives of 2-methyl-1,4-naphthohydroquinone having anti-hemorrhagic activity, and more particularly relates to monoacyl-2-methyl-1,4-naphthohydroquinone monosulfuric acid esters and salts thereof.

One of the more active anti-hemorrhagic compounds of the vitamin K type is 2-methyl-1,4-naphthoquinone, it being very widely used in the treatment of hypo-prothrombinemia, hemorrhagic diathesis of the newly born, post-operative bleeding in jaundice, and persons having prothrombin deficiencies.

The quinone, however, is not entirely satisfactory for all types of administration. For example, it is water-insoluble and cannot be satisfactorily administered parenterally. Furthermore, it is extremely sensitive to light. The 2-methyl-1,4-naphthoquinone may be reduced to the corresponding hydroquinone which is stable to light and which has a satisfactory anti-hemorrhagic activity. However, the 2-methyl-1,4-naphthohydroquinone is not water-soluble, and hence cannot be utilized in the preparation of aqueous parenteral solutions. In the past, aqueous solutions of the sodium bisulfite addition compounds of 2-methyl-1,4-naphthoquinone and the mono-glycosides of the corresponding hydroquinone have been used for parenteral administration. These prior art aqueous solutions are not entirely satisfactory preparations, and it is desirable that a satisfactory preparation be provided. One of the disadvantages of the aqueous solutions of the sodium bisulfite addition compounds is that in neutral solutions they cannot be sterilized by heat and must be kept at the objectionably low pH of 2.5 in order to avoid loss of activity. The mono-glycosides suffer the disadvantages of being difficult to prepare and forming somewhat unstable solutions.

In accordance with the present invention it has been found that the hitherto unknown monoacyl-2-methyl-1,4-naphthohydroquinone sulfuric acid esters will form extremely water-soluble salts. These aqueous solutions are essentially neutral, stable under ordinary conditions, and can be readily sterilized by heat without loss of anti-hemorrhagic activity. The solutions can be used orally, intramuscularly or intravenously and show approximately the same activity as the sodium bisulfite addition compounds or the monoglycosides.

A suitable method for preparing a representative compound, monoacetyl -2- methyl - 1,4-naphthohydroquinone sodium sulfate will be illustrated in conjunction with the following specific example. It should be understood, however, that the example is given merely by way of illustration and the invention is not to be limited to the details set forth therein.

*Monoacetyl-2-methyl-1,4-naphthohydroquinone sodium sulfate*

To a solution of 3 cc. of pyridine in 30 cc. of carbon tetrachloride was added 1.5 cc. of chlorosulfonic acid followed by 3 g. of the monoacetate of 2-methyl - 1,4 - naphthohydroquinone. After being refluxed ten minutes the mixture was cooled in an ice bath and the solvent decanted from the gummy pyridine salt. The latter was dissolved in 30 cc. of water and neutralized with 2.4 g. of anhydrous sodium carbonate. The aqueous solution, after being washed with chloroform, was treated with an equal volume of saturated sodium chloride solution and cooled at 0° C. The separated sodium sulfuric ester (3.6 g.) was removed by filtration and purified by two recrystallizations from water.

The monoacetyl-2-methyl-1,4-naphthohydroquinone employed in the above process may be conveniently prepared by treating the diacetate of 2-methyl-1,4-naphthohydroquinone in methanol with ammonium hydroxide at room temperature for about twenty-four hours and recrystallizing from a suitable solvent.

The monoacetyl derivative of 2-methyl-1,4-naphthohydroquinone is the preferred monoacyl derivative for carrying out the above reaction because of its cheapness and availability. Instead of the monoacetate any other organic monoacyl derivative of 2-methyl-1,4-naphthohydroquinone may be employed. Among the suitable ones may be included monopropionyl, monobutyryl, monosuccinyl, monolactyl, monobenzyl, and the like.

In the salt-forming step sodium carbonate is preferred. It should be understood, however, that suitable bases of any alkali forming metals may be employed instead thereof, including those of potassium, lithium, calcium, and the like.

An intramuscular preparation of the vitamin K compound, sodium 1-acetoxy-2-methyl-4-naphthyl sulfate can be prepared as follows:

For 1 liter of solution:

| | Grams |
|---|---|
| Sodium-2- acetoxy -2- methyl -4 -naphthyl sulfate | 12.1 |
| Sodium bisulfite | 1.20 |
| Sodium chloride | 8.00 |
| Distilled water q. s. to 1000 cc. | |

The sodium bisulfite is dissolved in the distilled water (about 800 cc.) and the sodium chloride added. After solution is complete the sodium-1-acetoxy-2-methyl-4-naphthyl sulfate is dissolved. The solution is adjusted to 1000 cc. volume with distilled water and filtered through a porous glass filter to remove lint. (The glass filter is washed with a solution of 0.12% bisulfite in distilled water prior to filtering the vitamin solution.) The clear, lint-free, colorless liquid is filled in 1 cc. ampules and sterilized by heating at 100° C. for twenty minutes.

It is obvious that the preceding description and examples are intended to be illustrative only and that they may be varied or modified to a considerable extent without departing from the spirit of the invention or sacrificing the advantages thereof. We do not, therefore, intend to limit ourselves to the embodiments herein set forth except as indicated in the appended claims.

I claim:

1. A process which comprises reacting a monoacyl-2-methyl-1,4-naphthohydroquinone with chlorosulfonic acid to give a monoacyl-2-methyl-1,4-naphthohydroquinone monosulfuric acid ester.

2. A process which comprises reacting monoacetyl-2-methyl-1,4-naphthohydroquinone with chlorosulfonic acid to give monoacetyl-2-methyl-1,4-naphthohydroquine monosulfuric acid ester.

3. A process which comprises reacting monoacetyl-2-methyl-1,4-naphthohydroquinone with chlorosulfonic acid to give monoacetyl-2-methyl-1,4-naphthohydroquinone monosulfuric acid ester and subsequent treatment with sodium carbonate to give monoacetyl-2-methyl-1,4-naphthohydroquinone sodium sulfate.

4. A compound of the group consisting of monoacetyl-2-methyl-1,4-naphthohydroquinone monosulfuric acid ester and salts thereof.

5. The compound monoacetyl-2-methyl-1,4-naphthohydroquinone monosulfuric acid ester.

BERNARD R. BAKER.